(12) United States Patent
Ma et al.

(10) Patent No.: US 10,089,696 B2
(45) Date of Patent: Oct. 2, 2018

(54) BUDGET-AWARE EVENT INFORMATION COLLECTION DURING PROGRAM EXECUTION

(75) Inventors: Zhiqiang Ma, Platteville, WI (US); Paul M. Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 13/997,643

(22) PCT Filed: May 9, 2012

(86) PCT No.: PCT/US2012/037150
§ 371 (c)(1),
(2), (4) Date: Mar. 12, 2014

(87) PCT Pub. No.: WO2013/169247
PCT Pub. Date: Nov. 14, 2013

(65) Prior Publication Data
US 2014/0207632 A1    Jul. 24, 2014

(51) Int. Cl.
*G06Q 40/00*    (2012.01)
*G06F 11/36*    (2006.01)
*G06F 9/46*    (2006.01)

(52) U.S. Cl.
CPC ......... *G06Q 40/12* (2013.12); *G06F 11/3624* (2013.01); *G06F 11/3636* (2013.01)

(58) Field of Classification Search
CPC ........ G06Q 40/10; G06Q 40/02; G06Q 40/00; G06Q 30/04; G06Q 20/10
USPC .......................................................... 705/30
See application file for complete search history.

(56) References Cited

U.S. PATENT DOCUMENTS

| | | | |
|---|---|---|---|
| 5,784,554 A | 7/1998 | Hsiung | |
| 5,910,987 A * | 6/1999 | Ginter | G06F 21/10 |
| | | | 348/E5.006 |
| 2005/0150162 A1* | 7/2005 | Usherovich | A01G 5/06 |
| | | | 47/66.6 |

(Continued)

FOREIGN PATENT DOCUMENTS

TW      I297866 B     6/2008

OTHER PUBLICATIONS

International Preliminary Report on Patentability dated Nov. 20, 2014 for International Application No. PCT/US2012/037150, 6 pages.

(Continued)

*Primary Examiner* — Oger Garcia Ade
(74) *Attorney, Agent, or Firm* — Schwabe, Williamson & Wyatt, P.C.

(57) ABSTRACT

Embodiments of techniques and systems for slowdown-budget-aware event information collection are described. In various embodiments, a system may be configured to control collection of information for events associated with execution of a program during execution of the program based on a slowdown cost budget. In various embodiments, the slowdown cost budget may be set in order to help keep slowdown experienced due to associated event information collection within a range around the budget. In embodiments, this may provide a user with greater control over the effects of the associated event information collection and instrumentation than would be available due to simple sampling rate control. Other embodiments may be described and claimed.

27 Claims, 8 Drawing Sheets

(56) References Cited

U.S. PATENT DOCUMENTS

2006/0150162 A1* 7/2006 Mongkolsmai et al. ..... 717/131
2008/0276244 A1* 11/2008 Iyengar ............... G06F 11/3466
                                                              718/104
2009/0089558 A1   4/2009 Bradford et al.

OTHER PUBLICATIONS

International Search Report and Written Opinion dated Feb. 27, 2013 for International Application No. PCT/US2012/037150, 9 pages.
Office Action dated Sep. 8, 2015 for Taiwan Application No. 102114243, 9 pages.

* cited by examiner

BUDGET-AWARE EVENT INFORMATION COLLECTION DURING PROGRAM EXECUTION

CROSS REFERENCE TO RELATED APPLICATIONS

The present application is a national phase entry under 35 U.S.C. § 371 of International Application No. PCT/US2012/037150, filed May 9, 2012, entitled "BUDGET-AWARE EVENT INFORMATION COLLECTION DURING PROGRAM EXECUTION", which designated, among the various States, the United States of America. The Specification of the PCT/US2012/037150 Application is hereby incorporated by reference.

FIELD

Embodiments of the present invention relate generally to the technical field of data processing, and more particularly, to budget-aware event information collection during program execution.

BACKGROUND

During development, many software developers will utilize dynamic program analysis to analyze and test programs during execution. Traditionally, program event information are collected using instrumented versions of program code being executed; this information may later be analyzed to investigate the execution of the program. Thus, code for the program is instrumented to add additional calls and storage access such that information about events that occur during execution is collected and recorded. However, collection of event information can slowdown execution of the program by adding various time costs of the instrumented code. This slowdown can make program analysis time consuming and, when program interactions are time-sensitive, difficult to control.

Various techniques attempt to deal with slowdown by collecting event information using sampling rate control. Thus, in some techniques, a sampling rate percentage is set between 0% and 100% and sampling of program events is only performed at that rate. However, control of program event information using sampling rate does not necessarily squarely address the issue discussed above, which is slowdown cost of executing instrumented code. While some techniques may assume that sampling rate is related to slowdown, other factors affect slowdown as well, such as introduction of instrumentation during execution, and the relative complexity of the application under test itself. Thus, if a tester is interested in controlling the actual slowdown experienced during testing, the sampling rate provides merely a crude control.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
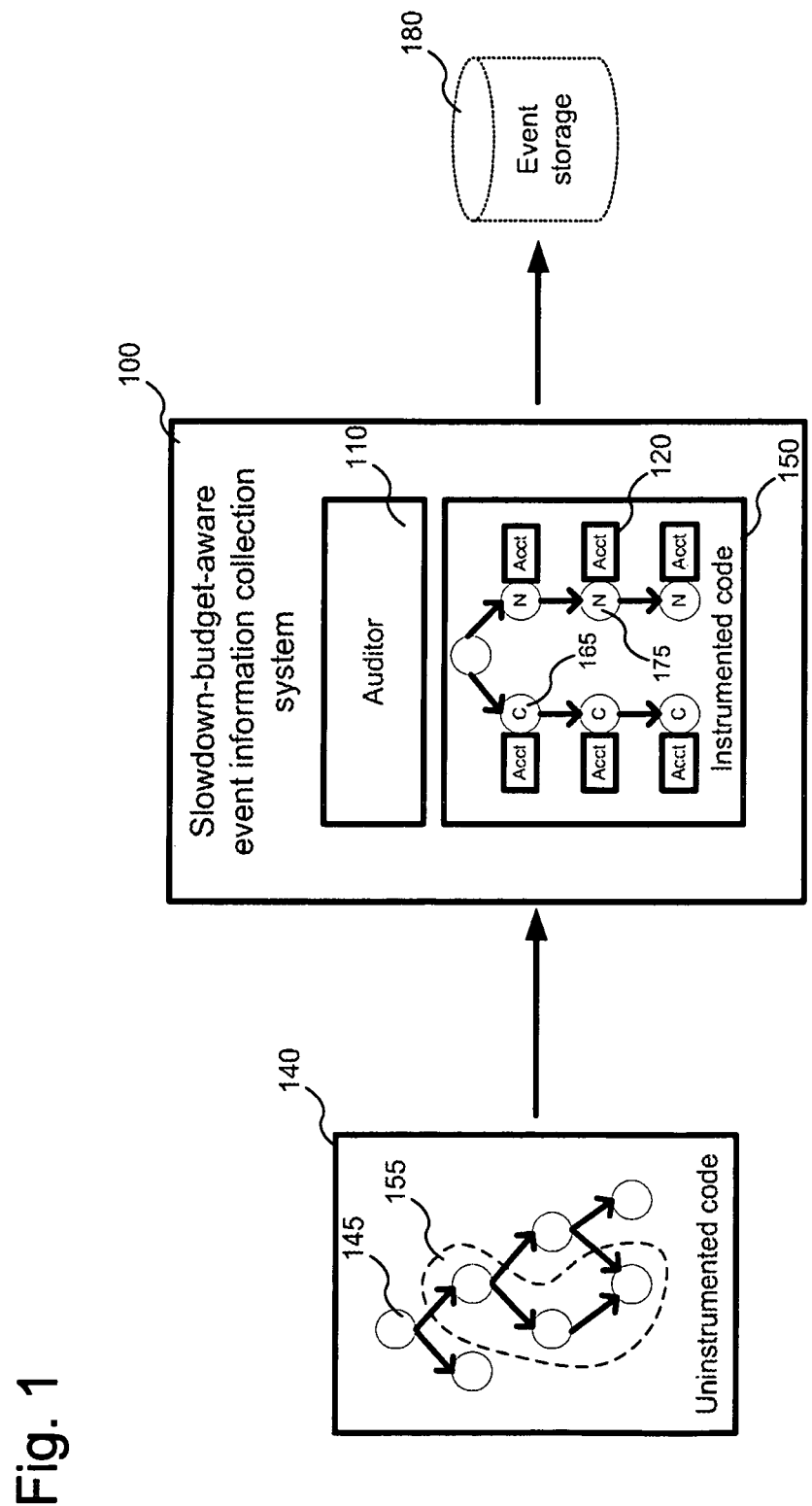
FIG. 1 illustrates an example slowdown-budget-aware event information collection system, in accordance with various embodiments.

Referring now to FIG. 1, example embodiments of a slowdown-budget-aware event information collection system 100 ("SBA system 100"), in accordance with the present disclosure, are illustrated. In various embodiments, the SBA system 100 may be configured to control collection of information for events associated with execution of a program during execution of the program, based on a slowdown cost budget. In various embodiments, the slowdown cost budget may be a value between 0 and 1 that may be set in order to help keep slowdown experienced due to associated event information collection within a range around the budget. In embodiments, this may provide a user with greater control over the effects of the associated event (hereinafter, simply "event") information collection and instrumentation than would be available due to simple sampling rate control.

In embodiments, the SBA system 100 may receive un-instrumented code 140 for a program that is to be analyzed. In embodiments, the uninstrumented code 140 may comprise source code, compiled code, an intermediate representation, and/or other code for the program. In various embodiments, as illustrated, the uninstrumented code 140 may contain one or more basic blocks 145; as discussed below, in embodiments control of event information collection may be performed on the level of these basic blocks. Additionally, as described below, control of event information collection may be performed with respect to one or more traces. In various embodiments, a trace may include a stream or set of instructions for an executing thread with one entry point and one or more exit points. A trace may consist of one or more basic blocks. Such an example trace 155 is represented in the uninstrumented code 140 by the dotted line.

In various embodiments, the SBA system 100 may modify the uninstrumented code by adding event information collection code to create instrumented code 150. In various embodiments, this instrumented code 150 may be executed as part of the SBA system 100 in order to generate event information. The event information may be stored in event storage 180. In various embodiments, the instrumented code 150 may include one or more versions of code based on basic blocks that were present in the uninstrumented code. Thus, for example, as illustrated in FIG. 1, instrumented code 150 contains two versions of code based on the trace 155. One version of code contains collecting basic blocks 165 that are instrumented to collect information about events that occur during the execution of the blocks. The other version of code contains non-collecting basic blocks 175 that are instrumented to not collect information about events that occur during the execution of the blocks. In various embodiments, and as illustrated in FIG. 1, separate traces containing either all collecting basic blocks or all non-collecting basic blocks may be generated by the SBA system 100. In alternative embodiments, the SBA system 100 may utilize more than two versions of code. In alternative embodiments, rather than generating completely collecting and completely non-collecting basic blocks, the SBA system 100 may utilize different versions of code such that one version collects information about a subset of events compared to events for which information is collected by another version. In yet another embodiment, different versions of code may collect information about entirely separate types of events. In other alternative embodiments, the SBA system 100 may not utilize multiple versions of code, but instead may instrument basic blocks such that event information collection may be switched on or off during execution. In various embodiments, the collecting basic blocks 165 and the non-collecting basic blocks 175 may be created according to known code instrumentation techniques.

In various embodiments, the SBA system 100 may be configured to cause either collecting basic blocks 165 or non-collecting basic blocks 175 to be executed during execution of the program. In various embodiments, control of whether collecting basic blocks 165 or non-collecting basic blocks 175 are used may be performed on a thread-by-thread or a trace-by-trace basis. Thus, as illustrated in FIG. 1, the SBA system 100 may choose to execute either an all-collecting or all-non-collecting version of the trace 155 depending on whether event information collection is desired at that point during execution of the program. As discussed above, in some embodiments where basic blocks are generated to have switchable event information collection, the SBA system 100 may control this switching rather than control execution of one version of code over another.

In various embodiments, the decisions to execute versions of code may be made by operation of an auditor module 110. In various embodiments, the auditor module 110 may be configured to determine, for a given trace of a thread, whether to execute collecting basic blocks 165 or non-collecting basic blocks 175. Thus while only one auditor module 110 is illustrated in FIG. 1, in various embodiments, multiple auditor modules 110 may be utilized to control event information collection. In various embodiments, these determinations may be performed based on an analysis of event information collection data for a currently-executing thread.

In various embodiments, the auditor module 110 may be provided this event information collection data from one or more accountant modules 120. In various embodiments, these accountant modules 120 may be each associated with a basic block in the instrumented code, such as collecting basic blocks 165 and noncollecting basic blocks 175. In various embodiments, the accountant modules 120 may be configured to operate to maintain a count of the number of times a basic block is entered. In various embodiments, such a count may be kept in a counter called T.number_of_events_occurred, such as described below. In various embodiments, the accountant modules 120 may also be configured to operate to maintain a count of the number of times event information for a basic block is collected. In various embodiments, such a count may be kept in a counter called T.number_of_events_collected, such as described below. In various embodiments, only accountant modules 120 that are associated with collecting basic blocks may be configured to operate to maintain the count of the number of times event information is collected. Particular embodiments of operations of auditor modules 110 and the accountant modules 120 are described below. These embodiments may be implemented in hardware, software or combinations thereof. Hardware implementations may include e.g., but not limited to, programmable circuits programmed with the implementation logic. Software implementations may include e.g., but not limited to, routines of programming instructions configured to be executed by one or more processors to effectuate the functions.

Prior to discussing particular operations of the auditor modules 110 and the accountant modules 120, it may be helpful to outline examples of relationships that may be relied upon in various embodiments. In some embodiments, alternative formulations of the relationships described below may be used, or one or more relationships may not be used.

In various embodiments, a total execution time of a dynamic analysis run for a program may be broken into 3 portions:

$$Cost_{total} \approx Cost_{instrumentation} + Cost_{application} + Cost_{collect+analyze},$$

where $Cost_{instrumentation}$ may be a time taken to instrument the uninstrumented code for the program, $Cost_{application}$ may be a time the program's own instructions take, and $Cost_{collect+analyze}$ may be a time to run the instrumentation code inserted into the uninstrumented code to collect and analyze program events.

$Cost_{collect+analyze}$ may be considered as a particular example. If an average time for collecting and analyzing a single event performed during execution is represented by $t_{event}$ and $N_{event}$ number of events are collected and analyzed in total, then $Cost_{collect+analyze}$ may be represented by:

$$Cost_{collect+anaylze} = N_{event} \times t_{event}$$

This, in turn, may give the relationship:

$$Cost_{total} \approx Cost_{instrumentation} + Cost_{application} + (N_{event} \times t_{event})$$

This relationship then may imply that a program execution slowdown caused by analysis can be calculated:

$$Slowdown_{total} = Cost_{total} / Cost_{application} \approx$$
$$Cost_{instrumentation} / Cost_{application} + 1 + (N_{event} \times t_{event}) / Cost_{application} \geq$$
$$Cost_{instrumentation} / Cost_{application} + 1$$

According to this relationship, in various embodiments, even if no events are collected or analyzed, a minimal slowdown may be represented by $$Cost_{instrumentation} / Cost_{application} + 1.$$

This "minimal" slowdown term ($Cost_{instrumentation}/Cost_{application}+1$) may be referred to as survival slowdown:

$$Slowdown_{survival} = Cost_{instrumentation}/Cost_{application}+1$$

Which may, in turn, give the relationship:

$$Slowdown_{total} =$$
$$Cost_{total}/Cost_{application} \approx Slowdown_{survival} + (N_{event} \times t_{event})/Cost_{application}$$

Given this relationship, a full analysis (which may collect and analyze all events in a program) may be compared to a sampled analysis (which may only collect and analyze a fraction of the events. The slowdown terms for these full and sampled analyses may be represented by:

$$Slowdown_{full} \approx Slowdown_{survival} + (N_{full} \times t_{event})/Cost_{application}$$

$$Slowdown_{sampled} \approx Slowdown_{survival} + (N_{sampled} \times t_{event})/Cost_{application}$$

Given these terms, it may be considered that the sampled analysis slowdown is a fraction of the full analysis slowdown, thus:

$$Slowdown_{sampled} = \beta \times Slowdown_{full}, 0 \leq \beta \leq 1,$$

Using this relationship, a relationship between the number of events collected during full and sample analyses may be identified:

$$N_{sampled}/N_{full} \approx (\beta \times Slowdown_{full} - Slowdown_{survival})/(Slowdown_{full} - Slowdown_{survival})$$

Using this relationship, it turn, it may be considered that if $N_{sampled}/N_{full} \leq (\beta \times Slowdown_{full} - Slowdown_{survival})/(Slowdown_{full} - Slowdown_{survival})$, then a sampled analysis will complete within a time $\beta \times Slowdown_{full}$. In addition to demonstrating a relationship between numbers of events collected during full and sample analyses, in various embodiments, this relationship may also describe a relationship between a number of events occurring during execution of a program (since a full analysis may collect every event that occurs) and a number of events that are actually collected (e.g., sampled).

In various embodiments, the term $\beta$ used in this last-stated relationship may be defined as a slowdown cost budget. In various embodiments, for a multithread program, if the above conditions are true for each thread, the whole program may in turn complete within this slowdown cost budget. Thus, through comparison of the slowdown cost budget to numbers of events that have occurred and numbers of events for which information has been collected, a user of the SBA system 100 may be provided with effective control of slowdown of an analyzed program through manipulation of the slowdown cost budget.

Figure 2:
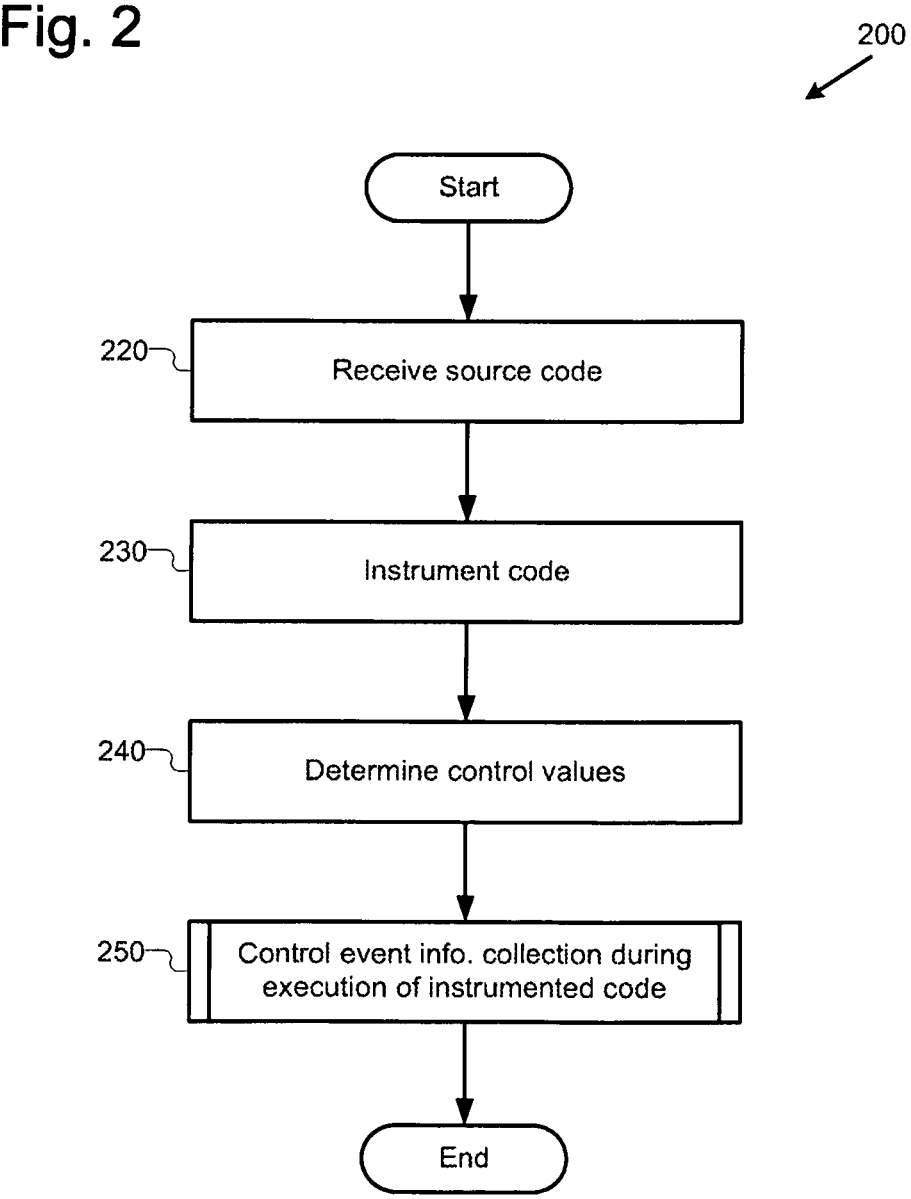
FIG. 2 illustrates an example slowdown-budget-aware event information collection process, in accordance with various embodiments.

FIG. 2 illustrates an example slowdown-budget-aware event information collection process 200 in accordance with various embodiments. In various embodiments, process 200 may be performed by the SBA system 100 to control event information collection for a program during execution of the program. Process 200 may begin at operation 220, where the SBA system 100 may receive uninstrumented code 140 for the program to be analyzed. At operation 230, the SBA system 100 may instrument the uninstrumented code 140 to generate instrumented code 150. In various embodiments, operation 230 may include generation of one or more collecting basic blocks 165 and/or one or more non-collecting basic blocks 175. In various embodiments, part of instrumentation performed at operation 230 may be performed according to known instrumentation techniques.

Next, at operation 240, the SBA system 100 may determine control values to be used in controlling event information collection during execution of the instrumented code 150. In various embodiments, operation 240 may include determination of one or more of the following values:

Slowdown$_{full}$, which may represent a slowdown cost if information for all events is collected; and Slowdown$_{survival}$ which may represent a slowdown cost if information for no events is collected.

In various embodiments, these values may be determined by executing the program with and without event information collection and comparing the results. Thus, if the program were executed with instrumentation and with information being collected for 100% of events, the execution time of that execution could be compared to execution time for uninstrumented code for the program; this difference may provide the Slowdown$_{full}$ value. Similarly, if the program were executed with instrumentation and with information being collected for no events, the execution time of that execution could be compared to execution time for uninstrumented code for the program; this difference may provide the Slowdown$_{survival}$ value. In alternative embodiments, known benchmarks for slowdown values may be utilized, or a user may be allowed to set slowdown values manually.

Additionally, at operation 240, additional slowdown cost budget values may be determined. In various embodiments, these values may include:

β, representing a slowdown cost budget. The value of β may, in various embodiments, be constrained to values between 0 and 1.

γ, representing a slowdown upper bound. In various embodiments, the auditor may be configured to control event information collection such that slowdown cost does not exceed $(1+\gamma)\beta$ in case execution of the program runs over budget temporarily. The value of γ may, in various embodiments, be constrained to values between 0 and 1.

ω, representing a slowdown lower bound. In various embodiments, the auditor may be configured to control event information collection such that slowdown cost does not fall below $(1-\omega)\beta$ in case the program runs in budget. The value of ω may, in various embodiments, be constrained to values between 0 and 1.

In various embodiments, an expected sample rate may also be set for each thread and trace. In embodiments, the auditor module 110 may cause event information to be collected if event information collection rates fall below the sample rate, regardless of whether the slowdown cost budget is exceeded. In various embodiments, as described below, this expected sample rate may be initially set to 1, meaning that, at least initially, information may be collected for 100% of events. However, in order that the high expected sample rate does not prevent the auditor module 110 from following the slowdown cost budget, the expected sample rate may, in various embodiments, be decremented for each time event information is collected in a trace. Thus, operation 240 may also include determination of the following additional values:

σ, representing an expected sample rate decrement. The value of σ may, in various embodiments, be constrained to values between 0 and 1.

ε, representing a lower bound of an expected sample rate for event information collection. The value of ε may, in various embodiments, be constrained to values between 0 and 1. In various embodiments, a may be set to the same value as β.

Returning to FIG. 2, at operation 250, the SBA system 100 may control collection of event information during execution of instrumented code 150. Particular embodiments of operation 250 are described below with reference to FIG. 3.

Figure 3:
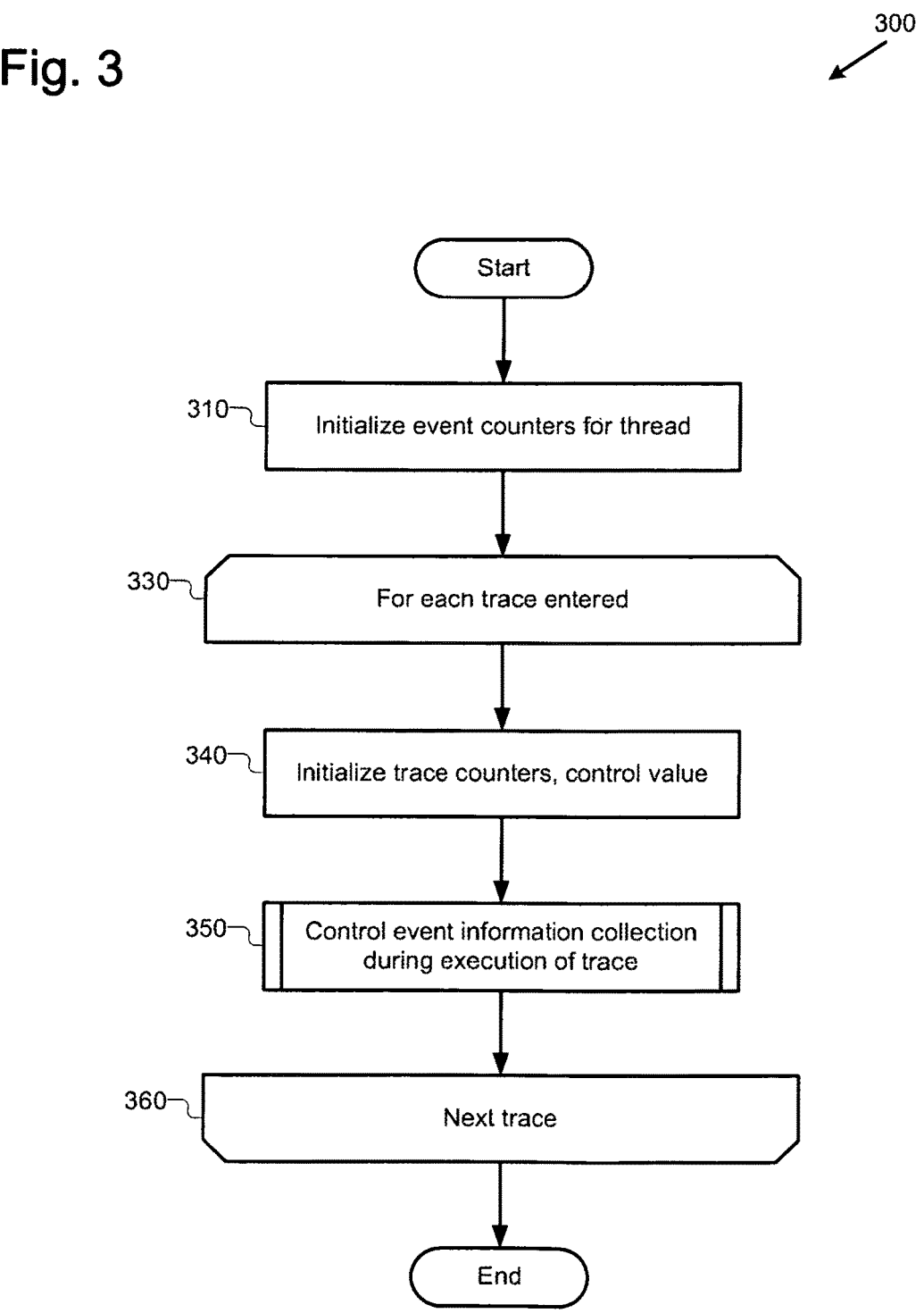
FIG. 3 illustrates an example slowdown-budget-aware thread execution process, in accordance with various embodiments.

FIG. 3 illustrates an example slowdown-budget-aware thread execution process 300 in accordance with various embodiments. In various embodiments, process 300 may be performed by the auditor module 110 of the SBA system 100 to control collection of event information for a thread during execution of instrumented code 150 as an implementation of operation 250 of process 200.

Process 300 may begin at operation 310, where the auditor module 100 may initialize event counters for a thread to be executed. In various embodiments, a thread T may have two counters: T.number_of_events_collected and T.number_of_events_occurred. These counters may, in various embodiments, exist for the lifetime of a thread. In various embodiments, T.number_of_events_occurred may represent a total number of events that have occurred on T that could have been collected and analyzed. In various embodiments, T.number_of_events_collected may represent a total number of events that have been actually collected and analyzed during execution of the thread. In various embodiments, both of these counters may be initialized to the value 0. In alternative embodiments, different event counters may be utilized for a thread. In various embodiments, these counters may be updated per-thread by one or more accountant modules 120 that increment the counters, such as described below. For example, in various embodiments, if a collecting version of a basic block is entered, then the accountant module 120 for that basic block may increment T.number_of_events_occurred and T.number_of_events_collected by a number of events in that basic block. In contrast, if a non-collecting version of a basic block is entered, then the accountant module 120 for that basic block may only increment T.number_of_events_occurred by a number of events in that basic block.

Next, at operation 330, a loop may be entered for every trace in the thread. At operation 340, the auditor module 100 may initialize event counters and a control value for the trace. In various embodiments, a trace R on thread T may have two counters, T.R.number_of_time_entered, T.R.number_of_times_sampled, and a control value, T.R.expected_sample_rate. These counters and control value may, in various embodiments, exist for the lifetime or a trace. In various embodiments, T.R.number_of_times_entered may represent a total number of times the thread T has entered the trace R. In various embodiments, T.R.number_of_times_sampled may represent a total number of times the events in R have been collected and analyzed on T. In various embodiments, both of these counters may be initialized to the value 0. In various embodiments, the control value T.R.expected_sample_rate may represent a current expected sample rate of R on T, as described above. In various embodiments, as described above, the T.R.expected_sample_rate control value may be initialized to the value 1. In various embodiments, one or more of these counters may be incremented based on whether a collecting or non-collecting version of code is used. For example, in embodiments, if a collecting version of code is used, then both T.R.number_of_time_entered, and T.R.number_of_times_sampled may be incremented. By contrast, in embodiments, if a non-collecting version of code is used, then only T.R.number_of_time_entered may be incremented.

Returning to FIG. 3, at operation 350, the auditor 110 may control collection of event information during execution of the trace. Particular embodiments of operation 350 are described below with reference to FIG. 4. At operation 360, process 300 may loop for the next trace. Once the loop has been performed for each trace in the thread, the process may end.

Figure 4:
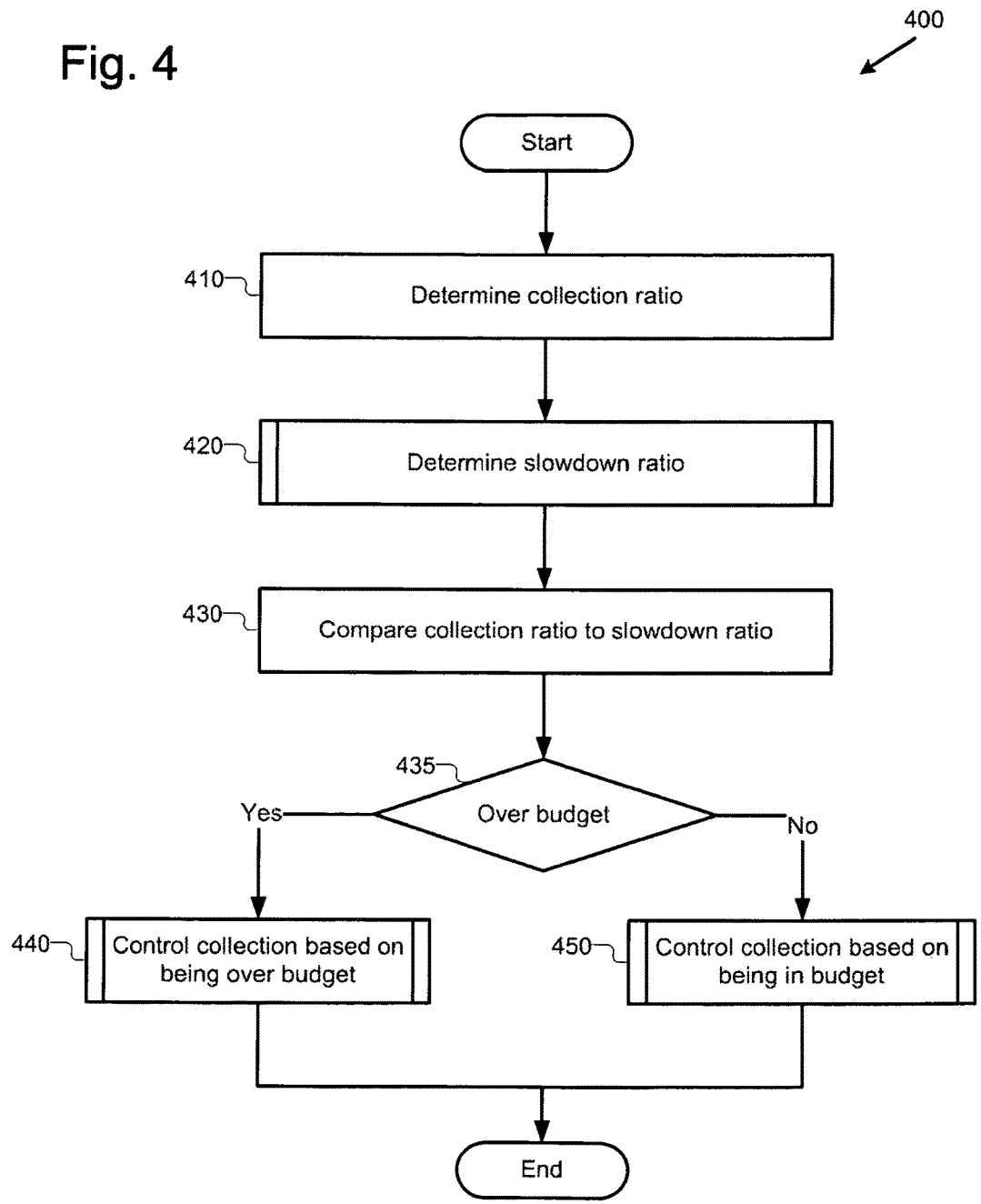
FIG. 4 illustrates an example slowdown-budget-aware trace execution process, in accordance with various embodiments.

FIG. 4 illustrates an example slowdown-budget-aware trace execution process 400 in accordance with various embodiments. In various embodiments, process 400 may be performed by the auditor module 110 of the SBA system 100 to control collection of event information for a trace during execution of instrumented code 150 as an implementation of operation 350 of process 300. The process may begin at operation 410, where the auditor may determine a collection ratio for event information collected in the thread being executed. In various embodiments, determination of the collection ratio may include determination of the value T.number_of_events_collected/T.number_of_events_occurred. In various embodiments, the values kept in these counters may be updated through operations of the accountant modules 120.

Figure 5:
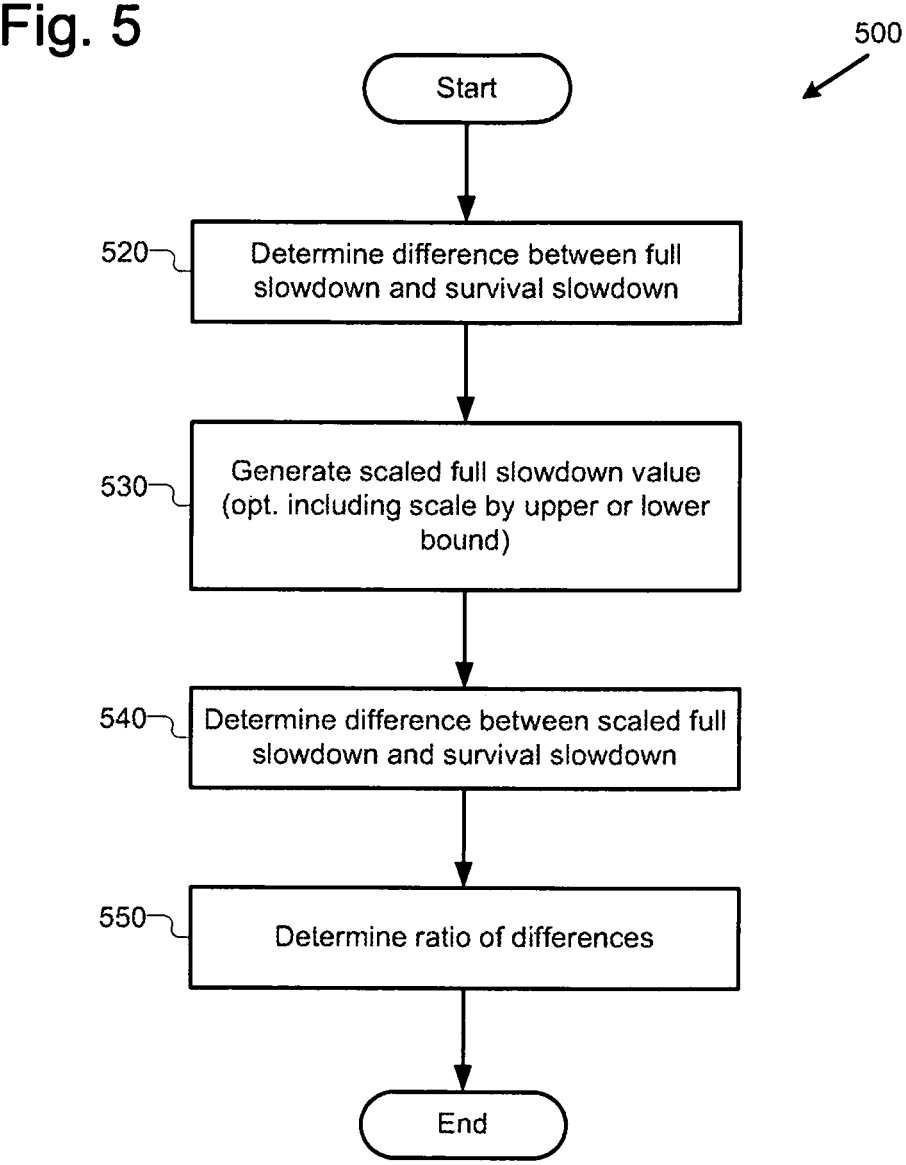
FIG. 5 illustrates an example slowdown ratio determination process, in accordance with various embodiments.

Next, at operation 420, the auditor may determine a slowdown ratio for the application. In various embodiments, operation 420 may be performed through operation of process 500 of FIG. 5. Turning to FIG. 5 illustrates an example slowdown ratio determination process 500 in accordance with various embodiments. In various embodiments, process 500 may be performed by the auditor module 110 of the SBA system 100 to determine a slowdown ratio as an implementation of operation 350 of process 300, operation 620 of process 600 (described below) and/or operation 720 of process 700 (also described below). The process may begin at operation 520, where the auditor module 110 may determine a difference between a full slowdown cost and a survival slowdown cost for the program. In various embodiments, the determination of operation 520 may include determination of $Slowdown_{full} - Slowdown_{survival}$, as described above. Next, at operation 530, the auditor module 110 may determine a scaled full slowdown cost value. For example, in embodiments, the generation of operation 530 may include generation of the value $\beta \times \text{Slowdown}_{full}$. In other embodiments, such as when implementing operations 620 of process 600 and 720 of process 700, the generation of the scaled full slowdown cost value may include scaling according to either the upper bound value $\gamma$ or the lower bound value $\omega$. Thus, in some embodiments, operation 530 may include generation of the value $\beta \times (1+\gamma) \text{Slowdown}_{full}$ or $\beta \times (1-\omega) \text{Slowdown}_{full}$.

Next at operation 540, the auditor module 110 may determine a difference between the scaled full slowdown cost and the survival slowdown cost. Thus, in embodiments, the auditor may, at operation 540, determine a value for $\beta \times \text{Slowdown}_{full} - \text{Slowdown}_{survival}$. In other embodiments, the first term of the difference may be additionally scaled according to the upper bound value $\gamma$ or the lower bound value $\omega$. At operation 550, the auditor module 110 may then compute a ratio of the difference determined at operations 520 and 540. Thus, at operation 550, the auditor module may determine a value for the term $(\beta \times \text{Slowdown}_{full} - \text{Slowdown}_{survival})/(\text{Slowdown}_{full} - \text{Slowdown}_{survival})$. The process may then end.

Returning to FIG. 4, after operation 420, at operation 430, the auditor module 110 may compare the determined collection ratio to the determined slowdown ratio. In various embodiments, if the determined collection ratio is lower than the determined slowdown ratio, the execution of the program may be considered to be "in budget"; if the determined collection ratio is higher than the determined slowdown ratio, the execution of the program may be considered to be "over budget." At decision operation 435, the auditor module 110 may thus determine if the execution is "over budget." If the execution is "over budget," then at operation 440, collection of event information may be controlled based on the execution being over budget. In various embodiments, operation 440 may be performed through operation of process 600 of FIG. 6. By contrast, if the execution is "in budget," then at operation 450, collection of event information may be controlled based on the execution being in budget. In various embodiments, operation 450 may be performed through operation of process 700 of FIG. 7. In either event, after operation 440 or 450, the process may then end.

Figure 6:
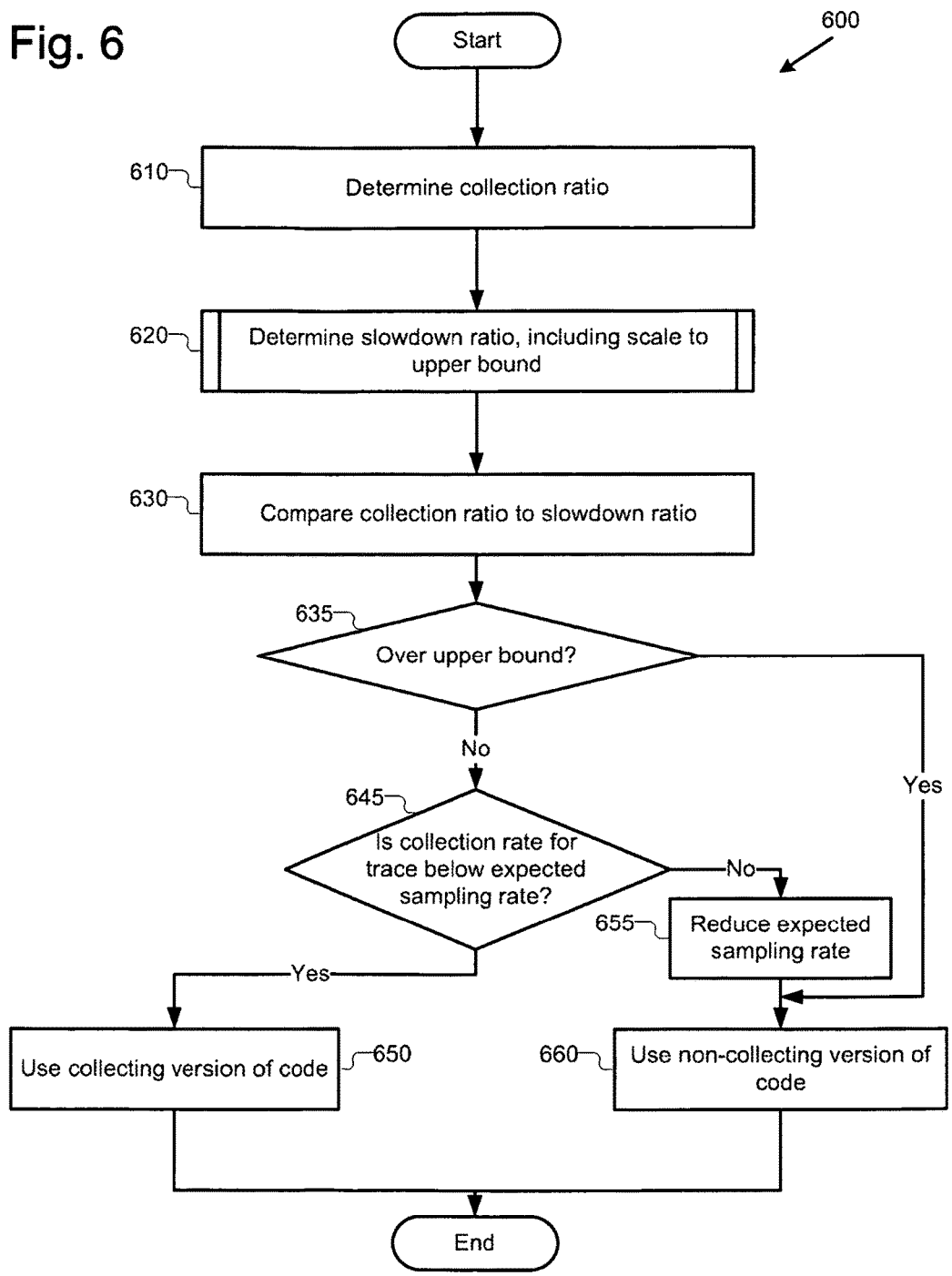
FIG. 6 illustrates an example slowdown-budget-aware over-budget event information collection control process, in accordance with various embodiments.

FIG. 6 illustrates an example slowdown-budget-aware over-budget event information collection control process 600 in accordance with various embodiments. In various embodiments, process 600 may be performed by the auditor module 110 of the SBA system 100 to control event information collection as an implementation of operation 440 of process 400. The process may begin at operation 610, where the auditor module 100 may determine the collection ratio, such as described above. Next, at operation 620, the auditor module 110 may determine a slowdown cost ratio, including a scale to the upper bound value $\gamma$. In embodiments, operation 620 may be performed by performance of process 500 of FIG. 5. Next, at operation 630, the auditor module 110 may compare the determined collection ratio to the slowdown cost ratio (including the scale to the upper bound value $\gamma$).

At decision operation 635, the auditor module 110 may determine, based on the comparison at operation 630, whether the execution of the program is currently over the upper bound value for the slowdown (in addition to being "over budget"). Examples of this determination are described herein, such as in the code segment listed below. If the auditor determines that the execution is over the upper bound, then at operation 660 the auditor module 110 may control execution of the instrumented code 150 of the program to use a non-collecting version of code, such as non-collecting basic blocks 175.

In contrast, if, at decision operation 635 the auditor determines that the execution is not over the upper bound, then at operation 645, the auditor module 110 may determine if a collection rate for the trace has fallen below an expected sampling rate, such as that defined in the control value T.R.expected_sample_rate. If not, then at operation 655 the auditor module 110 may reduce the expected sample rate. In various embodiments, the expected sample rate may be reduced by $\sigma$, the expected sample rate decrement value determined at operation 240. Additionally, in various embodiments, the expected sample rate may be reduced only as far as $\varepsilon$, the lower bound for the expected same rate. Next, at operation 660 the auditor module 110 may control execution of the instrumented code 150 of the program to use a non-collecting version of code, such as non-collecting basic blocks 175. If the collection rate has fallen below the expected sampling rate for the trace then, then at operation 650 the auditor module 110 may control execution of the instrumented code 150 of the program to use a collecting version of code, such as collecting basic blocks 165. The process may then end.

Figure 7:
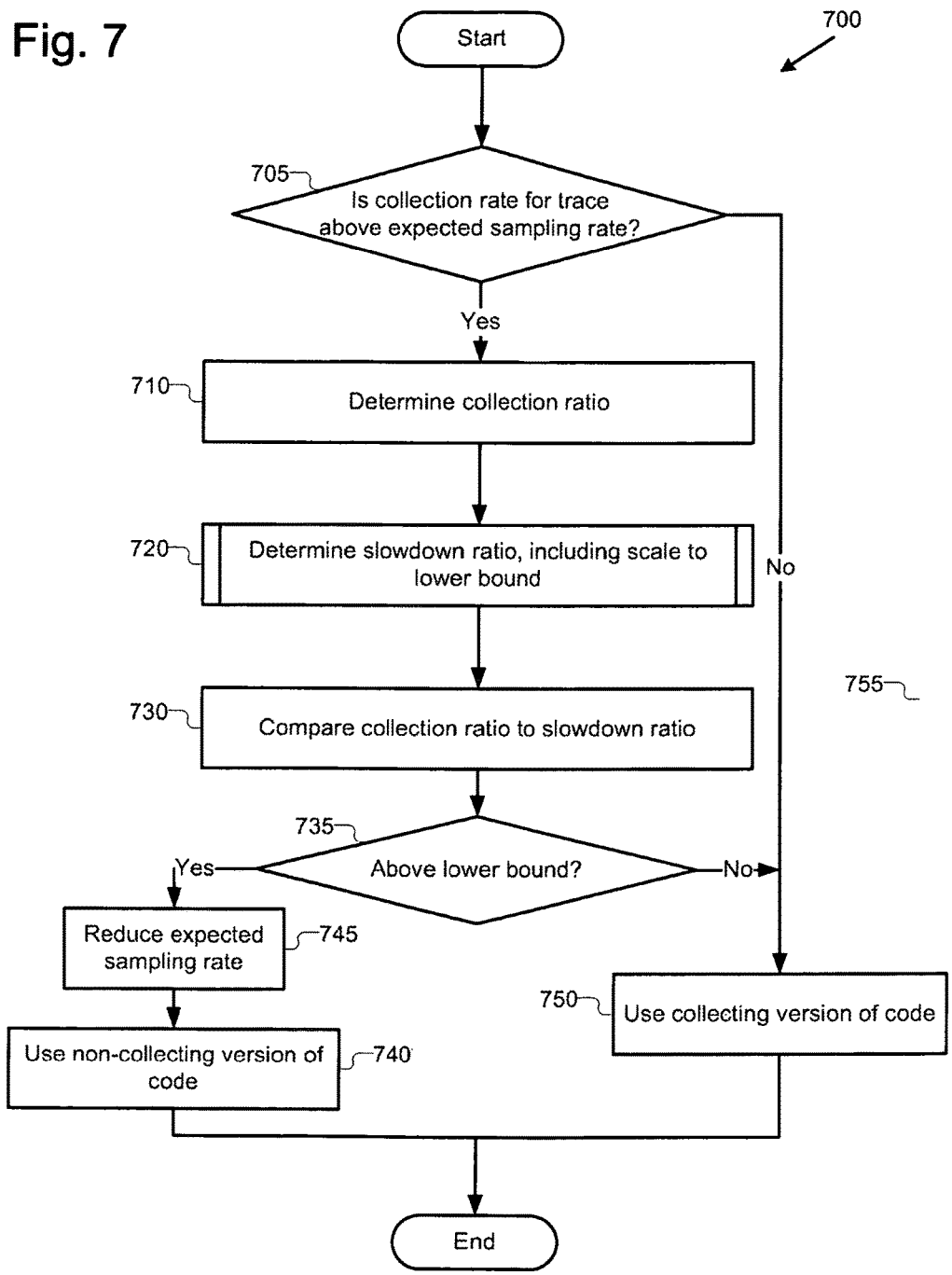
FIG. 7 illustrates an example slowdown-budget-aware in-budget event information collection control process, in accordance with various embodiments.

FIG. 7 illustrates an example slowdown-budget-aware in-budget event information collection control process 700, in accordance with various embodiments. In various embodiments, process 700 may be performed by the auditor module 110 of the SBA system 100 to control event information collection as an implementation of operation 450 of process 400. The process may begin at operation 710, where the auditor module 110 may determine if a collection rate for the trace is above an expected sampling rate, such as that defined in the control value T.R.expected_sample_rate. If the rate is not above the expected sample rate for the trace, then at operation 750 the auditor module 110 may control execution of the instrumented code 150 of the program to use a collecting version of code, such as collecting basic blocks 165.

If, however, the rate is above the expected sample rate for the trace, then at operation 710, the auditor module 110 may determine the collection ratio, such as described above. Next, at operation 720, the auditor module 110 may determine a slowdown cost ratio, including a scale to the lower bound value $\omega$. In embodiments, operation 720 may be performed by performance of process 500 of FIG. 5. Next, at operation 730, the auditor module 110 may compare the determined collection ratio to the slowdown cost ratio (including the scale to the lower bound value $\omega$).

At decision operation 735, the auditor module 110 may determine, based on the comparison at operation 730, whether the execution of the program is currently above the lower bound value for the slowdown. Examples of this determination are described herein, such as in the code segment listed below. If the auditor determines that the execution is above the lower bound, then at operation 745 the auditor module 110 may reduce the expected sample rate. In various embodiments, the expected sample rate may be reduced by $\sigma$, the expected sample rate decrement value determined at operation 240. Additionally, in various embodiments, the expected sample rate may be reduced only as far as $\varepsilon$, the lower bound for the expected same rate. Next, at operation 740 the auditor module 110 may control execution of the instrumented code 150 of the program to use a non-collecting version of code, such as non-collecting basic blocks 175. If the auditor does not determine that the execution is above the lower bound, then at then at operation 750 the auditor module 110 may control execution of the instrumented code 150 of the program to use a collecting version of code, such as collecting basic blocks 165. The process may then end.

In various embodiments, the operations described above of the auditor module 110 and of the accountant modules 120 may be performed in software. In various embodiments, the software may operate according to one or more portions of the following pseudocode. In alternative embodiments, different procedures, calls, and flows may be utilized.

```
Auditor(T, R) /*For a thread T and trace R*/
{
   if ((T.number_of_events_collected /
      T.number_of_events_occured) >
((β × Slowdown_full − Slowdown_survival ) / (Slowdown_full −
Slowdown_survival ))) {
      /* running out of budget. can we go over budget? */
      if ((T.number_of_events_collected /
         T.number_of_events_occured) ≤
((β × (1 + γ) × Slowdown_full − Slowdown_survival ) / (Slowdown_full −
Slowdown_survival ))) {
            /* yes, overdraft */
            if (first time enter this trace)
               InitializeAtFirstTraceEntry(T, R);
            if ((T.R.number_of_times_sampled /
               T.R.number_of_time_entered ) <
T.R.expected_sample_rate) {
               T.R.number_of_times_sampled++;
               T.R.number_of_time_entered++;
               Goto the collecting version to collect the event
               information;
            }
            else {
               T.R.expected_sample_rate − = δ;
               if (T.R.expected_sample _rate < ε)
                  T.R.expected_sample_rate = ε;
               T.R.number_of_time_entered++;
               Goto the non-collecting version to skip collection of event
information;
            }
         }
         else {
            T.R.number _of_time_entered ++;
            Goto the non-collecting version to skip collection of event
            information;
         }
      }
      else {
         /* still within budget */
         if (T.R.number_of_times_sampled /
            T.R.number_of_time_entered >
T.R.expected_sample_rate) {
            /* sampled enough */
            if ((T.number_of_events_collected /
               T.number_of_events_occured) >
((β × (1 − ω) × Slowdown_full − Slowdown_survival ) / ( Slowdown_full −
Slowdown_survival )))
            {
               T.R.expected_sample_rate − = δ;
               if (T.R.expected_sample_rate < ε)
                  T.R.expected_sample_rate = ε;
               T.R.number_of_time_entered ++;
               Goto the non-collecting version to skip collection of event
information;
            }
            else {
               T.R.number_of_time_entered++;
               T.R.number_of_times_sampled++;
               Goto the collecting version to collect the event information;
            }
         }
         else {
            T.R.number_of_time_entered++;
            T.R.number_of_times_sampled++;
            Goto the collecting version to collect the event information;
         }
      }
}
Accountant(T, R, B) /*For a thread T, trace R, and basic block B*/
{
   N = number of events in basic block B;
   if (in collecting version) {
      T.number_of_events_collected += N;
      T.number_of_events_occured += N;
   }
   else {
      T.number_of_events_occured += N;;
   }
}
```

Figure 8:
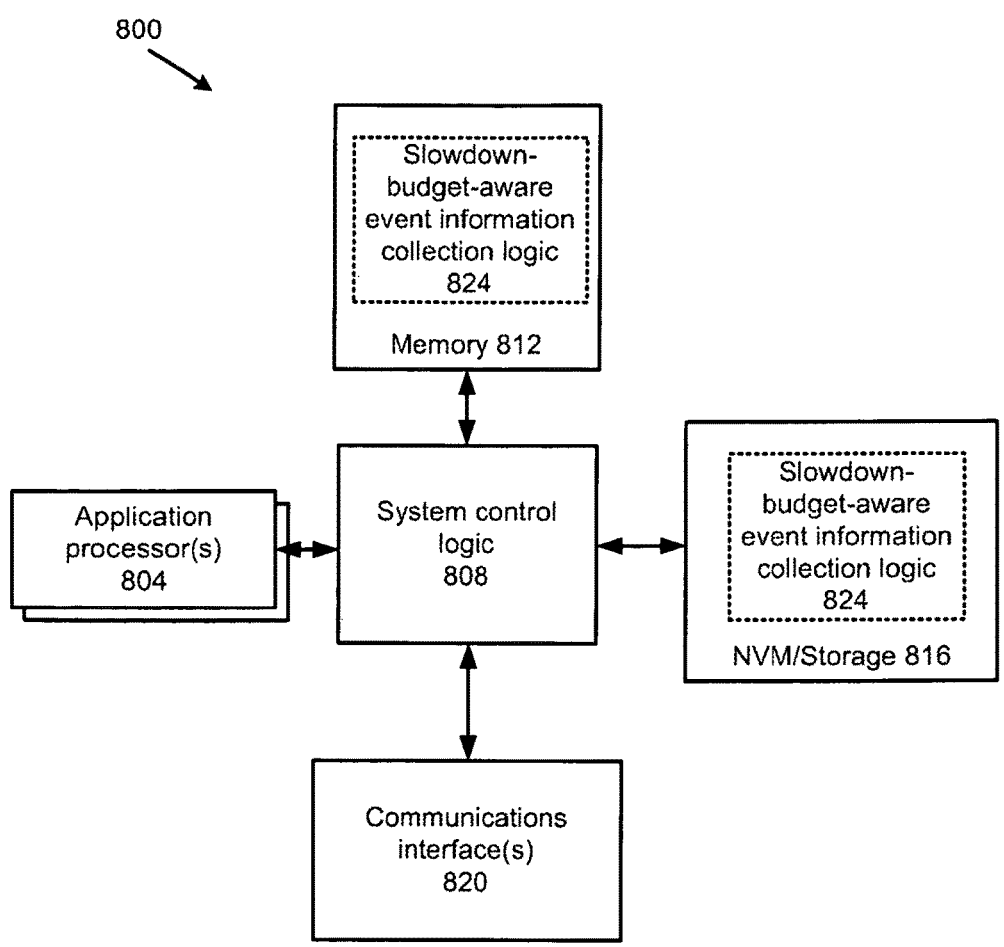
FIG. 8 illustrates an example computing environment suitable for practicing the disclosure, in accordance with various embodiments.

FIG. 8 illustrates, for one embodiment, an example computer system 800 suitable for practicing embodiments of the present disclosure. As illustrated, example computer system 800 may include control logic 808 coupled to at least one of the processor(s) 804, system memory 812 coupled to system control logic 808, non-volatile memory (NVM)/storage 816 coupled to system control logic 808, and one or more communications interface(s) 820 coupled to system control logic 808. In various embodiments, the one or more processors 804 may be a processor core.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. In one embodiment, system memory 812 may include any suitable volatile memory, such as suitable dynamic random access memory ("DRAM"), for example.

System control logic 808, in one embodiment, may include one or more input/output ("I/O") controller(s) to provide an interface to NVM/storage 816 and communications interface(s) 820.

NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

System memory 812 and NVM/storage 816 may include, in particular, temporal and persistent copies of slowdown-budget-aware event information collection logic 824. The slowdown-budget-aware event information collection logic 824 may include instructions that when executed by at least one of the processor(s) 804 result in the system 800 practicing one or more of the slowdown-budget-aware event information collection related operations described above. In some embodiments, the slowdown-budget-aware event information collection logic 824 may additionally/alternatively be located in the system control logic 808.

Communications interface(s) 820 may provide an interface for system 800 to communicate over one or more network(s) and/or with any other suitable device. Communications interface(s) 820 may include any suitable hardware and/or firmware, such as a network adapter, one or more antennas, a wireless interface, and so forth. In various embodiments, communication interface(s) 820 may include an interface for system 800 to use NFC, optical communications (e.g., barcodes), BlueTooth or other similar technologies to communicate directly (e.g., without an intermediary) with another device.

For one embodiment, at least one of the processor(s) 804 may be packaged together with system control logic 808 and/or slowdown-budget-aware event information collection logic 824. For one embodiment, at least one of the processor(s) 804 may be packaged together with system control logic 808 and/or slowdown-budget-aware event information collection logic 824 to form a System in Package ("SiP"). For one embodiment, at least one of the processor(s) 804 may be integrated on the same die with system control logic 808 and/or slowdown-budget-aware event information collection logic 824. For one embodiment, at least one of the processor(s) 804 may be integrated on the same die with system control logic 808 and/or slowdown-budget-aware event information collection logic 824 to form a System on Chip ("SoC").

The following paragraphs describe examples of various embodiments. In various embodiments, an apparatus for budget-aware event information collection during execution of a program on the apparatus may include one or more computer processors. The apparatus may include an auditor module configured to be operated by the one or more computer processors. The auditor module may be configured to determine, for a thread of the program executing on the apparatus, a collection ratio of a number of events associated with execution of the thread that have occurred during a period of execution of the thread and for which information has been collected to a total number of associated events that have occurred during the period of execution of the thread. The auditor module may also be configured to determine, based at least in part on the determined collection ratio, whether a slowdown cost budget has been exceeded. The auditor module may also be configured to determine, based at least in part on a result of the determination of whether a slowdown cost budget has been exceeded, whether to collect information about associated events occurring during execution of the thread subsequent to the period of execution.

In various embodiments, the apparatus may further include one or more accountant modules configured to be operated by the one or more computer processors to record occurrences of associated events during execution of the thread. In various embodiments, the apparatus the one or more accountant modules may be further configured to be operated by the one or more computer processors to record occurrences of information being collected about associated events by testing instrumentation during execution of the thread. In various embodiments, the one or more accountant modules may each associated with basic blocks of the program.

In various embodiments, the auditor module may be further configured to be operated by the one or more computer processors to select a version of code for the thread for the execution subsequent to the period based on the result of the determination of whether to collect information about associated events occurring during execution of the thread subsequent to the period. In various embodiments, the auditor module may be further configured to be operated by the one or more computer processors to select the version of code for the thread from a first version that is not configured to collect information about associated events and a second version that is configured to collect information about one or more associated events that occur during execution of the thread. In various embodiments, the second version may be configured to collect information about all associated events that occur during execution of the thread. In various embodiments, the auditor module may be further configured to be operated by the one or more computer processors to determine the collection ratio based on information that been collected by the previously-executed versions of code that are configured to collect information about one or more associated events that occur during execution of the previously-executed versions of code.

In various embodiments, the auditor module may be further configured to be operated by the one or more computer processors to determine, based at least in part on the determined collection ratio, whether the slowdown cost for the thread has exceeded a slowdown cost upper bound. The auditor module may also be configured to, if the slowdown cost has exceeded the slowdown cost upper bound, determine to collect no information about associated events occurring during execution of the thread.

In various embodiments, the auditor module may be further configured to be operated by the one or more computer processors to: determine, based at least in part on the determined collection ratio, whether the slowdown cost for the thread has dropped below a slowdown cost lower bound. The auditor module may also be configured to, if the slowdown cost has dropped below the slowdown cost lower bound, determine to collect information about associated events occurring during execution of the thread.

In various embodiments, the auditor module may be further configured to be operated by the one or more computer processors to, when a slowdown cost for the thread has exceeded the slowdown cost budget, determine, for a trace on the thread to be executed, whether a rate of previous sampling for the trace of the thread has fallen below an expected sampling rate for the trace of the thread. The auditor module may also be configured to, when the rate of previous sampling for the trace of the thread has fallen below the expected sampling rate for the trace of the thread, determine whether to collect information about associated events occurring during execution of the thread subsequent to the period, regardless of whether the slowdown cost budget has been exceeded.

In various embodiments, the auditor module may be further configured to be operated by the one or more computer processors to, when a slowdown cost for the thread has not exceeded the slowdown cost budget, determine, for a trace on the thread to be executed, whether a rate of previous sampling for the trace of the thread has exceeded an expected sampling rate for the trace of the thread. In auditor module may also be configured to, when the rate of previous sampling for the trace of the thread has exceeded the expected sampling rate for the trace of the thread, determine whether to collect information about associated events occurring during execution of the thread subsequent to the period, regardless of whether the slowdown cost budget has been exceeded.

In various embodiments, the auditor module may be configured to be operated by the one or more computer processors to determine whether to collect information about associated events occurring during execution of the thread subsequent to the period, regardless of whether the slowdown cost budget has been exceeded based at least in part on a determination of whether the slowdown cost for the thread has dropped below a slowdown cost lower bound.

In various embodiments, the thread may be a thread of an application executing on the one or more computer processors. In various embodiments, the auditor module may be configured to be operated by the one or more computer processors to determine whether the slowdown cost budget has been exceeded based at least in part on a comparison of the determined collection ratio to slowdown values representing additional time taken for execution of the application when instrumented to collect information about associated events that occurred during execution of the application. In various embodiments, the slowdown values may include a full slowdown value for the application, representing additional time taken for execution of the application when 100% of the events the application is instrumented to collect are collected, and a survival slowdown value for the application, representing additional time taken for execution of the application when none of the events the application is instrumented to collect are collected.

In various embodiments, the auditor module may be configured to be operated by the one or more computer processors to determine whether a slowdown cost for the thread has exceeded a slowdown cost budget through determination of a first difference between the full slowdown value and the survival slowdown value, determination of a second difference between a scaled slowdown value and the survival slowdown value, wherein the scaled slowdown value represents the full slowdown value after being scaled by the slowdown cost budget, determination of a slowdown ratio of the first difference to the second difference, and comparison of the slowdown ratio to the determined collection ratio.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable storage media having instructions embodied therein that are configured to cause a computer device, in response to execution of the instructions by the computer device, to:
   determine, for a thread to be executed on the computer device, a collection ratio of a number of events associated with execution of a second version of the thread that have occurred during a period of execution to a total number of associated events that have occurred during a period of execution of a first version of the thread,
   wherein the first version of the thread is instrumented to not collect information about events that occur during execution of the first version of the thread and the second version of the thread is instrumented to collect information about events that occur during execution of the second version of the thread, wherein the first version and the second version are part of a set of instrumented code created through modification of un-instrumented code;
   determine, based at least in part on the determined collection ratio, whether a slowdown budget has been exceeded, wherein the slowdown budget is a value that is a threshold amount of execution slowdown caused by information collection or analysis; and
   control the computer device to collect or not collect information about associated events occurring during subsequent execution of the instrumented code based at least in part on a result of the determination of whether the slowdown budget has been exceeded.

2. The one or more computer-readable storage media of claim 1, wherein the instructions are further to cause the computer device, in response to execution of the instructions, to select one of the first version or the second version of the thread for the subsequent execution based on a determination of whether to collect information about associated events occurring during execution of the instrumented code.

3. The one or more computer-readable storage media of claim 1, wherein the instrumented code further includes a third version of the thread that is instrumented to collect information about events that occur during execution of the thread, and the instructions are to cause the computer device, in response to execution of the instructions, to select a version of the thread for the subsequent execution from:
   the first version that is not to collect information about associated events during execution of the first version of the thread;
   the second version that is to collect information about one or more associated events that occur during execution of the second version of the thread; and
   the third version of the thread that is to collect information about one or more associated events that occur during execution of the third version of the thread different than the second version.

4. The one or more computer-readable storage media of claim 3, wherein the second version is to collect information about all associated events that occur during execution of the thread, and the third version is to collect information about a subset of all the associated events that occur during execution of the thread.

5. The one or more computer-readable storage media of claim 3, wherein the instructions are to cause the computer device, in response to execution of the instructions, to determine the collection ratio based on information that has been collected by previously-executed versions of code that are to collect information about one or more associated events that occur during execution of the previously-executed versions of code.

6. The one or more computer-readable storage media of claim 1, wherein the instructions are further to cause the computer device, in response to execution of the instructions, to:

determine, based at least in part on the determined collection ratio, whether a slowdown for the thread has exceeded a slowdown cost upper bound; and determine to collect no information about associated events occurring during execution of the thread when the slowdown has exceeded the slowdown upper bound.

7. The one or more computer-readable storage media of claim 1, wherein the instructions are further to cause the computer device, in response to execution of the instructions, to:

determine, based at least in part on the determined collection ratio, whether a slowdown for the thread has dropped below a slowdown lower bound; and determine to collect information about associated events occurring during execution of the thread when the slowdown cost has dropped below the slowdown lower bound.

8. The one or more computer-readable storage media of claim 1, wherein the instructions are further to cause the computer device, in response to execution of the instructions, to:

when a slowdown for the thread has exceeded the slowdown budget, determine, for a trace on the thread to be executed, whether a rate of previous sampling for the trace of the thread has fallen below an expected sampling rate for the trace of the thread;

when the rate of previous sampling for the trace of the thread has fallen below the expected sampling rate for the trace of the thread, determine whether to collect information about associated events occurring during execution of the thread subsequent to the period, regardless of whether the slowdown budget has been exceeded.

9. The one or more computer-readable storage media of claim 1, wherein the instructions are further to cause the computer device, in response to execution of the instructions, to:

when a slowdown for the thread has not exceeded the slowdown budget, determine, for a trace on the thread to be executed, whether a rate of previous sampling for the trace of the thread has exceeded an expected sampling rate for the trace of the thread;

when the rate of previous sampling for the trace of the thread has exceeded the expected sampling rate for the trace of the thread, determine whether to collect information about associated events occurring during execution of the thread subsequent to the period, regardless of whether the slowdown budget has been exceeded.

10. The one or more computer-readable storage media of claim 9, wherein the instructions are to cause the computer device, in response to execution of the instructions, to determine whether to collect information about associated events occurring during execution of the thread subsequent to the period, regardless of whether the slowdown budget has been exceeded based at least in part on a determination of whether the slowdown for the thread has dropped below a slowdown lower bound.

11. The one or more computer-readable storage media of claim 1, wherein:

the thread is a thread of an application executing on the computer device; and the instructions are to cause the computer device, in response to execution of the instructions, to determine whether the slowdown budget has been exceeded based at least in part on a comparison of the determined collection ratio to slowdown values representing additional time taken for execution of the application when instrumented to collect information about associated events that occurred during execution of the application.

12. The one or more computer-readable storage media of claim 11, wherein the slowdown values comprise:

a full slowdown value for the application representing additional time taken for execution of the application when 100% of the events the application is instrumented to collect are collected; and a survival slowdown value for the application representing additional time taken for execution of the application when none of the events the application is instrumented to collect are collected.

13. An apparatus for budget-aware event information collection during execution of a program on the apparatus, the apparatus comprising:

one or more computer processors; and an auditor module to be operated by the one or more computer processors to:

determine, for a thread of the program to be executed on the apparatus, a collection ratio of a number of events associated with execution of a second version of the thread that have occurred during a period of execution to a total number of associated events that have occurred during a period of execution of a first version of the thread, wherein the first version of the thread is instrumented to not collect information about events that occur during execution of the first version of the thread and the second version of the thread is instrumented to collect information about events that occur during execution of the second version of the thread, wherein the first version and the second version are part of a set of instrumented code created through modification of un-instrumented code;

determine, based at least in part on the determined collection ratio, whether a slowdown budget has been exceeded, wherein the slowdown budget is a threshold amount of execution slowdown caused by information collection or analysis; and control the one or more computer processors to collect or not collect information about associated events occurring during subsequent execution of the instrumented code based at least in part on a result of the determination of whether the slowdown budget has been exceeded.

14. The apparatus of claim 13, further comprising one or more accountant modules to be operated by the one or more computer processors to record occurrences of associated events during execution of the thread.

15. The apparatus of claim 14, wherein the one or more accountant modules are further to be operated by the one or more computer processors to record occurrences of information being collected about associated events by testing instrumentation during execution of the thread.

16. The apparatus of claim 14, wherein the one or more accountant modules are each associated with basic blocks of the program.

17. The apparatus of claim 13, wherein the auditor module is further to be operated by the one or more computer processors to select one of the first version or the second version of the thread for the subsequent execution based on the result of a determination of whether to collect information about associated events occurring during execution of the instrumented code.

18. The apparatus of claim 13, wherein the instrumented code further includes a third version of the thread that is instrumented to collect information about events that occur during execution of the thread, and the auditor module is further to be operated by the one or more computer processors to select a version of the thread for the subsequent execution from:
the first version that is not to collect information about associated events during execution of the first version of the thread;
the second version that is to collect information about a first subset of associated events that occur during execution of the second version of the thread; and
the third version of the thread that is to collect information about a second subset of associated events that occur during execution of the third version of the thread, wherein the first subset is different than the second subset.

19. The apparatus of claim 13, wherein the auditor module is further to be operated by the one or more computer processors to:
determine, based at least in part on the determined collection ratio, whether a slowdown for the thread has exceeded a slowdown upper bound; and
if the slowdown has exceeded the slowdown upper bound, determine to collect no information about associated events occurring during execution of the thread.

20. The apparatus of claim 13, wherein the auditor module is further to be operated by the one or more computer processors to:
determine, based at least in part on the determined collection ratio, whether a slowdown for the thread has dropped below a slowdown lower bound; and
if the slowdown has dropped below the slowdown lower bound, determine to collect information about associated events occurring during execution of the thread.

21. The apparatus of claim 13, wherein the auditor module is further to be operated by the one or more computer processors to:
when a slowdown for the thread has exceeded the slowdown budget, determine, for a trace on the thread to be executed, whether a rate of previous sampling for the trace of the thread has fallen below an expected sampling rate for the trace of the thread;
when the rate of previous sampling for the trace of the thread has fallen below the expected sampling rate for the trace of the thread, determine whether to collect information about associated events occurring during execution of the thread subsequent to the period, regardless of whether the slowdown budget has been exceeded.

22. The apparatus of claim 13, wherein the auditor module is further to be operated by the one or more computer processors to:
when a slowdown for the thread has not exceeded the slowdown budget, determine, for a trace on the thread to be executed, whether a rate of previous sampling for the trace of the thread has exceeded an expected sampling rate for the trace of the thread;
when the rate of previous sampling for the trace of the thread has exceeded the expected sampling rate for the trace of the thread, determine whether to collect information about associated events occurring during execution of the thread subsequent to the period, regardless of whether the slowdown budget has been exceeded.

23. The apparatus of claim 13, wherein the auditor module is to be operated by the one or more computer processors to determine whether to collect information about associated events occurring during execution of the thread subsequent to the period, regardless of whether the slowdown budget has been exceeded based at least in part on a determination of whether a slowdown for the thread has dropped below a slowdown lower bound.

24. The apparatus of claim 13, wherein:
the thread is a thread of an application executing on the one or more computer processors; and
the auditor module is to be operated by the one or more computer processors to determine whether the slowdown budget has been exceeded based at least in part on a comparison of the determined collection ratio to slowdown values representing additional time taken for execution of the application when instrumented to collect information about associated events that occurred during execution of the application.

25. The apparatus of claim 24, wherein the slowdown values comprise:
a full slowdown value for the application representing additional time taken for execution of the application when 100% of the events the application is instrumented to collect are collected; and
a survival slowdown value for the application representing additional time taken for execution of the application when none of the events the application is instrumented to collect are collected.

26. A computer-implemented method for budget-aware event information collection during execution of a program on a computer device, the method comprising:
determining, by the computer device, a collection ratio of a number of events associated with execution of a second version of the thread that have occurred during a period of execution to a total number of associated events that have occurred during a period of execution of a first version of the thread, wherein the first version of the thread is instrumented to not collect information about events that occur during execution of the first version of the thread and the second version of the thread is instrumented to collect information about events that occur during execution of the second version of the thread, wherein the first version and the second version are part of a set of instrumented code created through modification of un-instrumented code;
determining, by the computer device, based at least in part on the determined collection ratio, whether a slowdown budget has been exceeded, wherein the slowdown budget is a threshold amount of execution slowdown caused by information collection or analysis; and
control collection, by the computer device, of information about associated events occurring during subsequent execution of the instrumented code based on whether the slowdown budget has been exceeded.

27. The method of claim 26, further comprising: selecting, by the computer device, the first version or the second version of the thread for the subsequent execution based on a determination of whether to collect information about associated events occurring during execution of the instrumented code.

* * * * *